US012798699B2

(12) United States Patent
Schmid et al.

(10) Patent No.: US 12,798,699 B2
(45) Date of Patent: Nov. 17, 2026

(54) DEVICE FOR AUTOMATICALLY ESTABLISHING A CONNECTION BETWEEN A TOWING VEHICLE AND A TRAILER VEHICLE AND A SYSTEM INCLUDING THE DEVICE

(71) Applicant: ZF CV Systems Global GmbH, Bern (CH)

(72) Inventors: Andreas Schmid, Westpoint, IN (US); Daniel Williams, Thorntown, IN (US)

(73) Assignee: ZF CV Systems Global GmbH, Bern (CH)

(*) Notice: Subject to any disclaimer, the term of this patent is extended or adjusted under 35 U.S.C. 154(b) by 527 days.

(21) Appl. No.: 18/456,338

(22) Filed: Aug. 25, 2023

(65) Prior Publication Data

US 2025/0065965 A1 Feb. 27, 2025

(51) Int. Cl.
*B62D 53/12* (2006.01)
*B62D 53/08* (2006.01)

(52) U.S. Cl.
CPC ............. *B62D 53/12* (2013.01); *B62D 53/08* (2013.01); *B62D 53/0842* (2013.01); *B62D 53/125* (2013.01)

(58) Field of Classification Search
CPC .... B62D 53/12; B62D 53/0842; B62D 53/08; B62D 53/125; B60D 1/64
See application file for complete search history.

(56) References Cited

U.S. PATENT DOCUMENTS 1,713,332 A * 5/1929 Davis ..................... B62D 53/08 280/497
1,995,920 A * 3/1935 Gurton ................... B62D 53/08 280/438.1
2,119,460 A * 5/1938 Gurton ................. B62D 53/125 280/421
2,223,436 A * 12/1940 Winn ..................... B62D 13/02 280/426
2,277,179 A * 3/1942 Winn ..................... B62D 53/08 280/436
2,330,897 A * 10/1943 Kirksey ................. B62D 53/08 280/476.1
2,474,296 A * 6/1949 Wiltsce .................. B62D 53/08 280/492
2,480,483 A * 8/1949 Kirksey ............... B62D 53/125 280/421
2,515,574 A * 7/1950 Starr ...................... B62D 53/08 280/435
2,653,031 A * 9/1953 Butler ...................... B60D 1/44 280/468
2,692,146 A * 10/1954 Black ................. B62D 53/0842 280/432

(Continued)

*Primary Examiner* — Timothy Wilhelm
(74) *Attorney, Agent, or Firm* — Walter Ottesen, P.A.

(57) ABSTRACT

A device automatically establishes at least one connection between a towing vehicle and a trailer vehicle. The device includes an outrigger, an alignment device, a gripper arm and a gripper arm drive. A system includes the device. A towing vehicle includes a device or a system. A trailer vehicle is configured to be connected to a towing vehicle including the device or the system. A truck-trailer combination includes a towing vehicle and a trailer vehicle. Further, a method automatically establishes connections between a towing vehicle and a trailer vehicle.

20 Claims, 3 Drawing Sheets

(56) References Cited

U.S. PATENT DOCUMENTS

| | | | | |
|---|---|---|---|---|
| 2,850,292 | A * | 9/1958 | Holland | B62D 53/125 280/434 |
| 2,988,383 | A * | 6/1961 | Carson | B62D 53/08 280/479.2 |
| 3,601,427 | A * | 8/1971 | Holt | B60D 1/34 280/489 |
| 3,628,811 | A * | 12/1971 | Rivers | B62D 49/005 280/421 |
| 3,653,686 | A * | 4/1972 | Roesies | B62D 53/125 280/421 |
| 3,711,122 | A * | 1/1973 | Holmberg | B62D 53/125 280/421 |
| 3,734,537 | A * | 5/1973 | Holmberg | B62D 53/125 280/421 |
| 3,764,166 | A * | 10/1973 | Fiala | B62D 49/007 280/490.1 |
| 3,822,756 | A * | 7/1974 | Martin | B62D 53/04 172/253 |
| 3,888,513 | A * | 6/1975 | Pilz | B60D 1/62 280/421 |
| 3,891,238 | A * | 6/1975 | Ehlert | B60D 1/44 280/446.1 |
| 3,941,408 | A * | 3/1976 | Petersson | B60Q 1/305 280/421 |
| 4,125,272 | A * | 11/1978 | Putnam, Jr. | B60D 1/40 280/479.3 |
| 4,134,602 | A * | 1/1979 | Boger | B60D 1/40 D12/162 |
| 4,153,132 | A * | 5/1979 | Biedebach | B60D 1/44 280/468 |
| 4,420,169 | A * | 12/1983 | Taylor | B60D 1/30 280/446.1 |
| 4,502,561 | A * | 3/1985 | Kober | B60D 1/06 280/455.1 |
| 4,951,957 | A * | 8/1990 | Gullickson | B60D 1/40 280/479.2 |
| 5,000,472 | A * | 3/1991 | Vick, Jr. | B62D 53/125 280/438.1 |
| 5,044,653 | A * | 9/1991 | Savanella | B62D 53/125 280/421 |
| 5,346,239 | A * | 9/1994 | Wohlhuter | B62D 53/125 280/422 |
| 5,713,592 | A * | 2/1998 | Dunell | B60D 99/00 280/433 |
| 6,286,852 | B1 * | 9/2001 | Slatten | B60D 1/145 280/479.3 |
| 6,964,427 | B2 * | 11/2005 | Chumley | B62D 63/061 296/57.1 |
| 6,974,146 | B2 * | 12/2005 | Abair | B60D 1/36 280/491.2 |
| 7,258,181 | B2 * | 8/2007 | Hammonds | B62D 53/00 280/433 |
| 7,490,846 | B2 * | 2/2009 | Kaun | B62D 53/0814 280/441 |
| 7,731,215 | B2 * | 6/2010 | Alguera | B60T 17/043 280/421 |
| 7,967,319 | B2 * | 6/2011 | Alguera | B60D 1/62 280/428 |
| 8,091,913 | B1 * | 1/2012 | White | B60D 1/06 280/468 |
| 8,262,119 | B2 * | 9/2012 | Glazner | B60D 1/64 280/421 |
| 8,505,949 | B2 * | 8/2013 | Temple | B60D 1/64 280/421 |
| 8,505,950 | B2 * | 8/2013 | Kolda | B62D 53/08 280/421 |
| 8,565,983 | B2 * | 10/2013 | Alberius | B62D 53/08 701/79 |
| 8,641,074 | B2 * | 2/2014 | Goedken | B62D 53/0842 280/438.1 |
| 8,678,419 | B2 * | 3/2014 | Glazner | B60D 1/64 280/421 |
| 8,720,931 | B2 * | 5/2014 | Zaagman | B62D 53/08 280/438.1 |
| 8,770,612 | B2 * | 7/2014 | Wendte | B60D 1/62 280/421 |
| 8,794,656 | B2 * | 8/2014 | West | B62D 53/0864 280/479.2 |
| 8,820,768 | B2 * | 9/2014 | Grizzle | B60Q 5/001 280/433 |
| 8,840,128 | B2 * | 9/2014 | Glazner | B60R 16/08 280/422 |
| 8,925,954 | B2 * | 1/2015 | Williams, Jr. | B60D 1/36 280/479.2 |
| 9,102,371 | B2 * | 8/2015 | Keatley | B62D 53/08 |
| 9,126,464 | B2 * | 9/2015 | Zerba | B62D 53/08 |
| 9,126,644 | B2 * | 9/2015 | Banwart | B62D 53/0842 |
| 9,505,279 | B2 * | 11/2016 | Poirier | B62D 53/08 |
| 9,540,059 | B2 * | 1/2017 | Shirk, Jr. | B62D 53/10 |
| 9,612,179 | B2 * | 4/2017 | Hemerson | G01M 17/007 |
| 9,656,702 | B2 * | 5/2017 | Keatley | B62D 53/0807 |
| 9,751,575 | B2 * | 9/2017 | Stegemoeller | B62D 53/0842 |
| 9,796,226 | B2 * | 10/2017 | Turner | B60D 1/246 |
| 11,738,812 | B2 * | 8/2023 | Forthoffer | B62D 53/125 280/421 |
| 11,999,206 | B2 * | 6/2024 | Lacaze | B60D 1/62 |
| 12,194,797 | B2 * | 1/2025 | Köster | B60D 1/64 |
| 12,311,712 | B2 * | 5/2025 | Algüera | B60D 1/62 |
| 2006/0249927 | A1 * | 11/2006 | Metternich | B60D 1/64 280/515 |
| 2008/0036178 | A1 * | 2/2008 | Slaubaugh | A01B 59/042 280/479.2 |
| 2021/0039459 | A1 * | 2/2021 | Köster | B60D 1/64 |
| 2021/0053407 | A1 * | 2/2021 | Smith | B25J 19/021 |
| 2022/0332158 | A1 * | 10/2022 | Layfield | B60D 1/64 |
| 2023/0406425 | A1 * | 12/2023 | Köster | B62D 53/125 |
| 2025/0145231 | A1 * | 5/2025 | Johnson | B62D 53/08 |

* cited by examiner

DEVICE FOR AUTOMATICALLY ESTABLISHING A CONNECTION BETWEEN A TOWING VEHICLE AND A TRAILER VEHICLE AND A SYSTEM INCLUDING THE DEVICE

TECHNICAL FIELD

The disclosure relates to the field of commercial vehicles and in particular to towing vehicles, like trucks, configured as commercial vehicles. A towing vehicle is used to couple and move a trailer vehicle, which preferably is also configured as a commercial vehicle. Towing vehicles referred to herein are preferably semitrailer tractors, which are also referred to as trucks. Trailer vehicles referred to herein are preferably semitrailers, which are also referred to as trailers.

BACKGROUND

According to the prior art, several connections are predominantly made when coupling or uncoupling a trailer vehicle to or from a towing vehicle. Usually, a mechanical connection, which can also be called a towing connection, is first realized between the towing vehicle and the trailer vehicle with the aid of a mechanical coupling. In the case of a towing vehicle configured as a semitrailer tractor, the part of the coupling of the towing vehicle includes a fifth-wheel plate. Such a fifth-wheel plate has an insertion area and a holding area. Via the insertion area, a pin, known as a kingpin, of a trailer vehicle can be inserted into the holding area of the fifth-wheel plate. The kingpin is then engaged, that is, locked, in the holding area.

In addition to the towing connection, further connections, namely pneumatic and electrical connections, must be established between the towing vehicle and the trailer vehicle in order to enable various functions of a towing vehicle and trailer vehicle combination and to make the combination ready for driving.

Usually, two pneumatic connections are made, which are used to control the air brakes in the trailer vehicle by the towing vehicle. One of the pneumatic connections corresponds to a supply line for transferring compressed air from the towing vehicle to the trailer vehicle. The other pneumatic connection serves as a control line to control the brakes of the trailer vehicle depending on a control pressure specified by the towing vehicle.

Electrical connections, including two standardized plug-in connections, are also usually made between the towing vehicle and the trailer vehicle in order to control electrical systems of the trailer vehicle by the towing vehicle and, especially in the case of modern trailer vehicles, to exchange information between the trailer vehicle and the towing vehicle.

All these connections are usually established and released manually by a driver. In the field of fifth wheels, automated processes for establishing the towing connections for mechanical coupling are known in some cases. For example, from a driver's cabin, it is possible to engage or disengage the kingpin from the holding area of the fifth wheel. However, the other plug-in connections, namely the pneumatic and electrical connections between the towing vehicle and the trailer vehicle, must still be made manually by the driver.

Particularly in the field of autonomous driving, which is becoming increasingly relevant, it is desirable to implement the electrical and pneumatic connections between the towing vehicle and the trailer vehicle automatically, that is, without manual intervention by a driver. However, such automatic connections are not trivial to implement.

Document US 2022/0332158 A1 discloses an object manipulator including a robot arm, carrying an adapter as connector. The robot arm is adapted to swing about a transverse axis of the vehicle to either store the adapter in an unconnected state or to swing the adapter about the axis to the trailer vehicle to bring the adapter into a connected state. However, a special end effector with a first frame and a second frame, which are connected by a spring assembly, is needed to align the adapters of the towing vehicle and the trailer vehicle so that they can be connected. The end effector is very sensitive to impurities and mechanical impacts.

SUMMARY

It is therefore the task of the present disclosure to overcome the problems of the prior art. In particular, it is intended to automate establishing connections between a towing vehicle and a trailer vehicle. Preferably, while the connection is being established, it is intended to allow easy and robust alignment of the connectors. At least an alternative to the prior art shall be found.

The disclosure relates to a device for automatically establishing at least one connection between a towing vehicle and a trailer vehicle. The device includes: an outrigger extending along a longitudinal axis, the outrigger being configured to be connected to a fastening point of the towing vehicle and to pivot around the fastening point; an alignment device slidably mounted to the outrigger and configured to align the outrigger to the trailer vehicle; a gripper arm slidably mounted to the outrigger and configured to hold a truck connector; and, a gripper arm drive for moving the gripper arm in both directions of the longitudinal axis of the outrigger.

According to a first aspect of the disclosure, the disclosure is directed to a device for automatically establishing one or more connections between a towing vehicle and a trailer vehicle. The towing vehicle is preferably a semitrailer tractor and the trailer vehicle is preferably a semitrailer. In the following, the towing vehicle is also referred to as a tractor or truck and the trailer vehicle is also referred to as a trailer. The device serves for establishing a connection between a truck connector of the towing vehicle and a trailer connector of the trailer vehicle. Consequently, connecting or coupling the truck connector with the trailer connector establishes a connection.

The device includes an outrigger, which is arranged for being connected to a fastening point of the towing vehicle. The outrigger extends along a longitudinal axis.

Furthermore, the outrigger is arranged, when connected to the fastening point, for pivoting around the fastening point. Preferably, the outrigger is arranged for pivoting within a plane, which is substantially horizontally oriented or inclined at an angle of less than 20 degrees or preferably less than 10 degrees with respect to a horizontal plane, for example an underground surface on which a towing vehicle with the device is positioned or to a plane defined by the longitudinal and transverse axis of the towing vehicle.

Furthermore, the device includes an alignment device. The alignment device is slidably mounted to the outrigger. Furthermore, the alignment device is arranged for sliding along both directions of the longitudinal axis of the outrigger. Consequently, the alignment device includes a slide connection with the outrigger. Furthermore, the alignment device is arranged for aligning the outrigger to the trailer vehicle. Preferably, the alignment device includes a cross member slidably mounted at the outrigger, wherein the cross member includes a longitudinal axis, which is perpendicular to the longitudinal axis of the outrigger. The cross member of the alignment device includes two ends in its longitudinal direction, wherein a roller is arranged at each end. Each roller is rotatable around a vertical axis. The rollers are preferably arranged at or near the outer parts of the ends of the cross member.

According to the disclosure, the device furthermore includes a gripper arm, which is slidably mounted to the outrigger. The gripper arm is arranged for holding the truck connector. Consequently, the gripper arm includes a further slide connection and can thus slide along the longitudinal axis of the outrigger.

Furthermore, the device includes a gripper arm drive for moving the gripper arm in both directions of the longitudinal axis of the outrigger.

Thus, the alignment device is arranged for contacting a front side of the trailer vehicle during the process of establishing a connection between the towing vehicle and the trailer vehicle. The front side of the trailer vehicle pushes the alignment device along the outrigger and at the same time serves to pivot the outrigger around the fastening point and thus aligns the outrigger with the trailer front side. Preferably, after alignment of the outrigger by the alignment device, the longitudinal axis of the outrigger extends in a direction perpendicular to the front side of the trailer vehicle. Then the gripper arm drive moves the gripper arm, which holds the truck connector towards the front side of the trailer vehicle until the truck connector, for example a male connector, is connected with the trailer connector, for example a female connector. A connection between the towing vehicle and the trailer vehicle is thus established.

An easy alignment between the trailer vehicle and the towing vehicle with the device for automatically establishing the connection is thus provided.

Based on the resulting low number of mechanical parts, the device is very robust.

According to a first embodiment of the disclosure, the gripper arm includes a mechanism and an actuator for establishing and releasing a detachable connection to the truck connector, namely to hold and release the truck connector. Consequently, the mechanism and the actuator are arranged for fixing or holding the truck connector in a tight manner for moving the gripper arm by the gripper arm drive together with the truck connector towards the trailer vehicle for establishing the connection between the truck connector and the trailer connector. Furthermore, the truck connector can be held tight for releasing the connection between the truck connector and the trailer connector, for example by pulling the truck connector away from the trailer connector.

Furthermore, by means of the detachable connection, which is realized by a mechanism and an actuator, the connection between the gripper arm and the truck connector can be released and thus, the gripper arm and preferably the alignment device can slide away from the front of the trailer vehicle. Consequently, when the combination of a towing vehicle and a trailer vehicle after coupling goes around a curve, the outrigger can be held in a rest position and does not move relative to the towing vehicle.

According to a preferred embodiment, the device includes springs or spring devices, like an air spring or air suspension, to hold the outrigger in the rest position, when there is no contact between the trailer front and the alignment device and/or the gripper arm. However, when the alignment device is arranged at the front side of the trailer vehicle, and a force is exerted by the trailer vehicle front side to the alignment device, the alignment device makes the outrigger pivot around the fastening point to leave the rest position.

According to a further embodiment, the device includes an alignment drive arranged for moving the alignment device in both directions of the longitudinal axis. Consequently, the alignment drive and the gripper arm can be moved independently along the longitudinal axis of the outrigger. Preferably, the alignment drive is a pneumatic drive to provide a spring force holding the alignment drive in at least a first position until a higher force exerted by the trailer front side pushes the alignment device along the outrigger.

According to an alternative or further embodiment, a spring is arranged for moving the alignment device in a first direction of the longitudinal axis in particular to a direction to the pivoting or fastening point. The end position which can be taken by the alignment device near the fastening point can be referred to as first position.

Furthermore, the device includes a mechanism for detachably connecting or partly holding the alignment drive to the gripper arm for moving the alignment device in a second direction, opposite to the first direction of the longitudinal axis. Preferably, the mechanism for detachably connecting or partly holding the alignment drive to the gripper arm is actuated by the actuator for establishing and releasing the detachable connection between the gripper arm and the truck connector. Preferably, the actuator of the gripper arm is thus arranged by a first mechanism for releasing the truck connector and at the same time connecting the alignment device by the second mechanism with the gripper arm.

Consequently, the gripper arm can slide away from the fastening point without the truck connector after establishing a connection between the truck connector and the trailer connector and at the same time slide the alignment device away from the front of the trailer vehicle.

For releasing the connection between the truck connector and the trailer connector, the gripper arm can release the connection between the alignment device and the gripper arm and the alignment device is moved by the spring arrangement or the alignment drive to the front of the trailer vehicle, thus aligning the outrigger to the trailer vehicle. Then the gripper arm can be moved by the gripper arm drive towards the truck connector. By the actuator and the first mechanism the gripper arm can be connected to the truck connector wherein preferably no connection is established between the gripper arm and the alignment device. Then the gripper arm can pull the truck connector away from the trailer connector and thus release the connection between the truck connector and the trailer connector. Preferably, the alignment device is still positioned at the front of the trailer vehicle.

After the towing connection or mechanical coupling between the trailer vehicle and the towing vehicle is released, preferably the alignment device by the force of a spring device or the alignment drive slides in the first direction towards the fastening point and thus is in a position for establishing a new connection between a towing vehicle and a trailer vehicle, preferably the first position.

According to a further embodiment, the gripper arm includes an alignment pin arranged for further alignment of the gripper arm to a trailer recess. Preferably, the pin has the form of a cone or a triangle. The pin is preferably connected to the gripper arm in a spring-loaded manner. Furthermore preferably, the alignment pin extends beyond a connector plane of a truck connector, when the truck connector is held by the gripper arm. The pin is thus preferably a switch blade alignment device.

Consequently, when the gripper arm is moved by the gripper arm drive towards the trailer vehicle for connecting the truck connector with the trailer connector, the gripper arm is adjusted precisely by the alignment pin to the trailer vehicle. Preferably, a fine adjustment by the pin takes place before the truck connector reaches the trailer connector and thus, the two connectors are precisely adjusted before a connection is established. More preferably, by the spring of the pin, the pin is pushed towards the gripper arm, when alignment is completed to enable the gripper arm to push the truck connector towards the trailer connector completely for establishing a connection.

According to a second aspect, the disclosure is directed to a system. The system includes the device according to the first aspect and a truck connector. The truck connector is arranged for being detachably connected to the gripper arm. Thus, the shape of the gripper arm and the truck connector are matched to each other in such a way that preferably by the mechanism and actuator of the gripper arm the truck connector can be held securely by the gripper arm, for example in the case no trailer vehicle is connected. Furthermore, the matched shape of the truck connector and the gripper arm is preferably configured in such a way that the gripper arm can exert a force to the truck connector for connecting the truck connector with the trailer connector and for decoupling the truck connector and the trailer connector by pulling the truck connector.

According to a first embodiment of the system, the system includes a fifth wheel. Alternatively, according to a further aspect of the disclosure, a system with a device according to the first aspect and a fifth wheel is proposed.

The fifth wheel includes a lower part and an upper part. The lower part and the upper part are pivotally connected for providing a movement of the upper part with respect to the lower part in the form of a rotation around a transverse axis with respect to the towing vehicle. The lower part includes means for being connected with the towing vehicle. The upper part includes a contact surface to contact and support the trailer vehicle on the upper side of the upper part. The fastening point of the outrigger is arranged at a bottom of the upper part.

Consequently, the outrigger follows a pivoting of the upper part and thus the device is precisely aligned to a point on a vertical axis of the trailer vehicle. Furthermore, the fastening point and thus the outrigger is outside the operation area of the trailer vehicle. For example, this is the case when the towing vehicle approaches the trailer vehicle to make the mechanical connection with the fifth wheel or even during normal driving, so there is no danger of damaging the device at any time.

According to an embodiment of the system, the fifth wheel includes a kingpin opening for receiving a kingpin. The kingpin opening is furthermore arranged for allowing the kingpin to rotate around a kingpin rotation axis. Furthermore, the fastening point is arranged below the kingpin opening in such a way as to allow the outrigger to pivot around the kingpin rotation axis.

Thus, the fastening point enables the outrigger to pivot around the same axis around which the kingpin rotates when secured in the fifth wheel. Thus, the alignment device is arranged to exactly contact a front of the trailer vehicle independent from the articulation angle between the towing vehicle and the trailer vehicle. Consequently, a precise alignment is possible.

According to a further embodiment, the system includes a mounting part for a trailer vehicle. The mounting part is arranged for being mounted to a trailer front, wherein the longitudinal axis of the mounting part extends along a lateral axis of the trailer front. The mounting part provides a length in longitudinal axis that is arranged for being mounted at the trailer front extending at least at the predominant section of the width, in particular the lateral direction of the trailer vehicle. Furthermore, the mounting part includes a front part arranged for facing away from the trailer front, in particular towards a connected towing vehicle when there is no articulation angle between the towing vehicle and the trailer vehicle. The front part has a concave surface running along the length in a lateral direction of a trailer vehicle. The lowest point is in the middle of the mounting part and thus arranged on a trailer vehicle preferably in the middle of the width of the trailer front.

The mounting part can thus be arranged on a trailer front and thus supports the alignment device for aligning in the middle of the trailer vehicle.

According to a third aspect of the disclosure, a towing vehicle, namely a truck, is proposed. The towing vehicle according to the third aspect includes the device according to the first aspect or the system according to the second or the further aspect.

According to a fourth aspect of the disclosure, a trailer vehicle is proposed. The trailer vehicle is arranged for being coupled with a towing vehicle according to the third aspect, by a system according to the second aspect or by the device according to the first aspect. Consequently, the trailer vehicle includes a trailer connector for being connected with a truck connector. The trailer connector is arranged in the middle of a front of the trailer vehicle. Preferably, a frame, preferably a front traverse, or a chassis of the trailer vehicle includes an opening, wherein the trailer connector is arranged in the opening. The opening is preferably arranged in the frame or the chassis so that no parts of the trailer connector extend beyond a front side of the frame or chassis.

According to an embodiment of the trailer vehicle, the trailer vehicle includes a mounting part arranged at a front of the trailer vehicle, preferably in a vertical direction of the trailer vehicle above the trailer connector or opening with the trailer connector. The mounting part extends along a lateral axis of the trailer vehicle and includes a front part. The front part extends at least at the predominant section of a width of the trailer vehicle. The front part has a concave surface facing away from the trailer front, wherein the mounting part includes its lowest point in the middle of the width of the trailer front.

According to a further embodiment, a trailer recess is arranged near the trailer connector or near the opening with the trailer connector. The trailer recess is adapted to receive at least a part of an alignment pin arranged at the gripper arm. Preferably, the trailer recess is arranged below the trailer connector or below the opening with the trailer connector, seen in a vertical direction of the trailer vehicle. The trailer recess preferably has a shape of a triangle or a cone.

Furthermore, according to a fifth aspect of the disclosure, a truck-trailer combination is proposed. The truck-trailer combination includes a device according to the first aspect or a system according to the second aspect.

Moreover, the truck-trailer combination preferably includes a truck according to the third aspect or a trailer vehicle according to the fourth aspect.

According to a sixth aspect of the disclosure, the disclosure proposes a method. The method includes to establish or release a connection between a towing vehicle and a trailer vehicle with a device according to the first aspect or a system according to the second aspect.

According to an embodiment of the method, the method preferably includes to provide the outrigger of the device in a rest position, preferably in parallel alignment with a longitudinal axis of a towing vehicle, namely a truck. The outrigger is arranged for pivoting around a fastening point but is preferably provided in the rest position with the towing vehicle for example by a spring device. The fastening point of the outrigger is arranged at or near one end of the outrigger, wherein the outrigger extends along a longitudinal axis. An alignment device, which is slidably mounted at the outrigger is preferably provided at that end or near that end of the outrigger, which is connected to the fastening point.

Furthermore, a gripper arm, which is slidably mounted with the outrigger, is preferably provided at the other end of the outrigger. The gripper arm has a truck connector, which is connected with the gripper arm.

According to the method, while the towing vehicle is being coupled to the trailer vehicle, when approaching the towing vehicle to the trailer vehicle, a trailer front preferably pushes against the alignment device and thus, the alignment device slides to the other end of the outrigger, namely to the end opposite the fastening point. During this sliding by pushing, the alignment device aligns the outrigger in a perpendicular direction to a trailer front. After the trailer vehicle is connected to the towing vehicle with a fifth wheel, the gripper arm is moved by a gripper arm drive towards the trailer vehicle until the truck connector is connected to the trailer connector. A connection is established. Preferably, a mechanism and an actuator of the gripper arm then releases the connection between the gripper arm and the truck connector. The gripper arm drive moves the gripper arm and preferably the alignment device, which may be connected by the actuator with the gripper arm, away from the trailer vehicle, preferably to the end of the outrigger, which is arranged opposite to the fastening point. Consequently, the outrigger preferably moves back into its rest position by means of the spring device.

According to a further embodiment, the method includes releasing a connection between a truck connector and a trailer connector. For releasing the connection, the alignment device is moved towards the trailer vehicle and aligns the outrigger perpendicular to the trailer front. Then, the gripper arm is moved along the outrigger until the truck connector is connectable to the gripper arm. Preferably, the actuator and the mechanism of the gripper arm connects the truck connector to the gripper arm and then the gripper arm drive moves the gripper arm along the outrigger to pull the truck connector from the trailer connector and to release the connection.

The connection between the truck connector and the trailer connector is thus released.

BRIEF DESCRIPTION OF DRAWINGS

The invention will now be described with reference to the drawings wherein:

FIG. 8 shows a trailer front and a mounting part; and.

DETAILED DESCRIPTION

Figure 1:
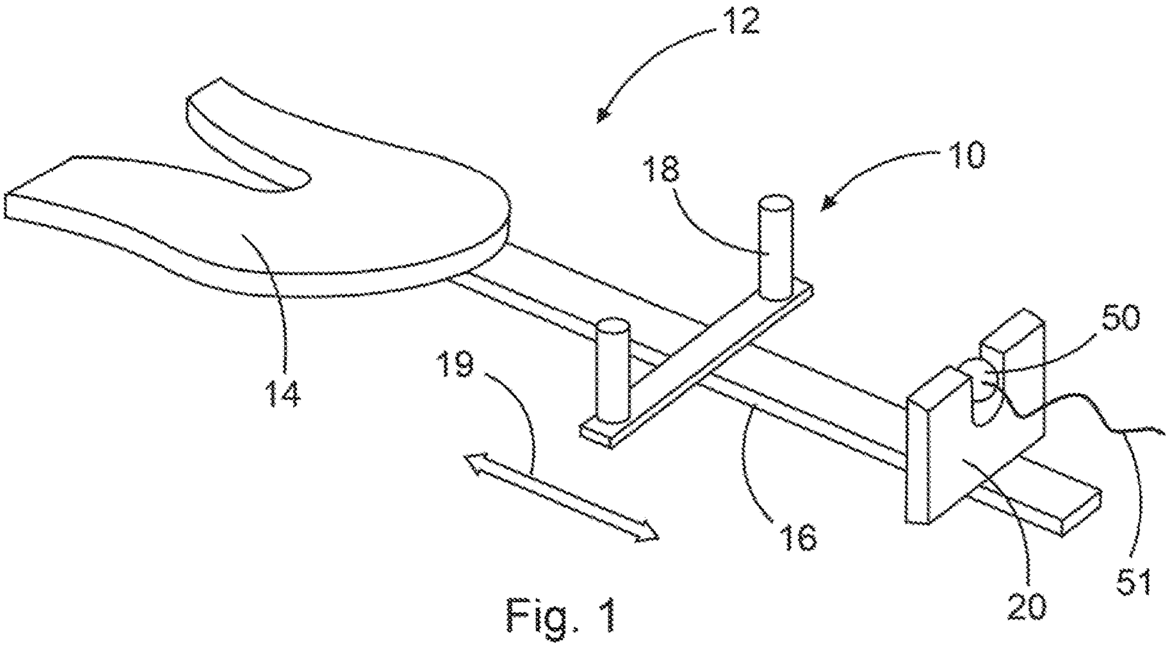
FIG. 1 shows an embodiment of the system in a perspective view.

FIG. 1 discloses a device 10 for automatically establishing connections between a towing vehicle and a trailer vehicle. The device 10 is part of a system 12 including the device 10 and a fifth wheel 14, which is mountable to a towing vehicle. The device 10 includes an outrigger 16, an alignment device 18 and a gripper arm 20. The alignment device 18 and the gripper arm 20 are slidably mounted on the outrigger 16 in a longitudinal axis 19 of the outrigger 16. The outrigger 16 is connected to the fifth wheel 14 at a fastening point and is thus arranged for pivoting around the fastening point. The gripper arm 20 holds a truck connector 50. The truck connector 50 is electrically and/or pneumatically coupled to a towing vehicle by connection lines 51.

Figure 2:
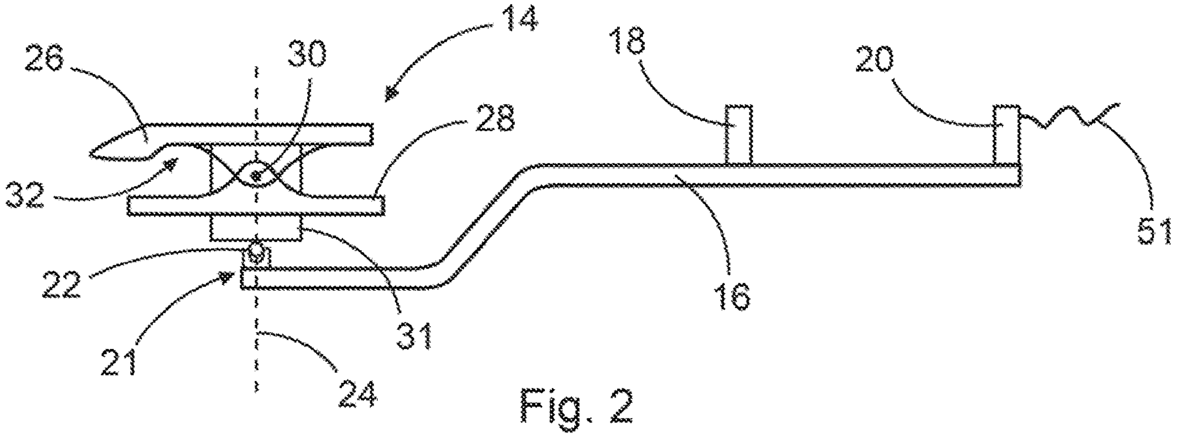
FIG. 2 shows a side view of an outrigger connected to a fifth wheel.

FIG. 2 shows a side view of a connection 21 between the outrigger 16 and the fifth wheel 14. The outrigger 16 is arranged for pivoting in a fastening point 22 around a vertical axis 24. The vertical axis 24 is identical to the vertical axis 24 around which a kingpin of a trailer vehicle pivots while driving through curves. The fifth wheel 14 includes an upper part 26 and a lower part 28, wherein the lower part 28 and the upper part 26 are pivotally connected by a connection 30. The outrigger 16 is connected on the bottom 32 of the upper part 26 by an adapter unit 31. Thus, when the upper part 26 pivots with respect to the lower part 28, the outrigger 16 follows the upper part 26.

Figure 3:
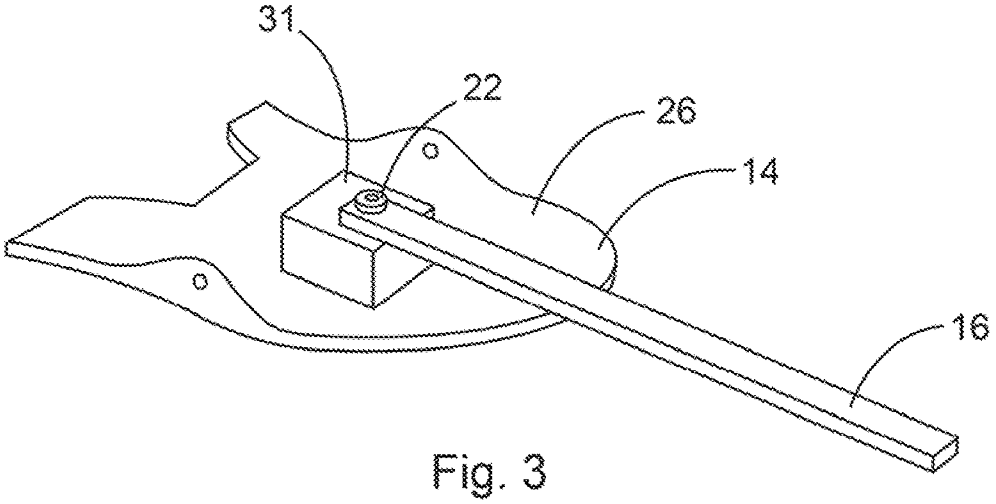
FIG. 3 shows a bottom view of a fifth wheel with a connected outrigger of the system.

FIG. 3 shows the upper part 26 of the fifth wheel 14 with the adapter unit 31 and the fastening point 22 from a bottom perspective of the fifth wheel 14.

Figure 4:
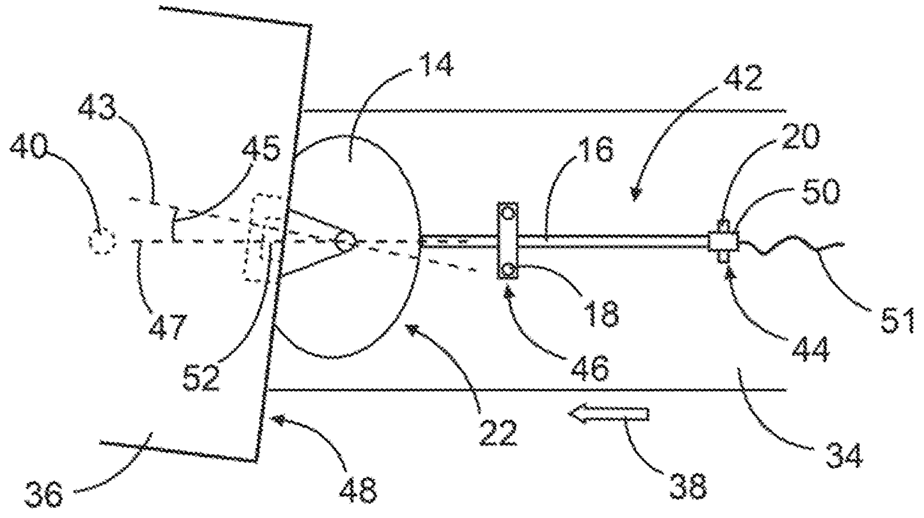
FIG. 4 shows a top view of a decoupled truck connector and trailer connector.

FIG. 4 discloses a top view of a towing vehicle 34 and a trailer vehicle 36, which are uncoupled. The towing vehicle 34 is moved backward in a direction 38 to couple the kingpin 40 of the trailer vehicle 36 in the fifth wheel 14. The outrigger 16 is in a rest position 42. The gripper arm 20 is moved to the end 44 opposite to the fastening point 22. The alignment device 18 is on an alignment position 46, which lies away from the gripper arm 20 near the end of the fastening point 22. The trailer longitudinal axis 43 has an angle 45 greater than zero to a longitudinal axis 47 of the towing vehicle 34. If the towing vehicle 34 is moved further into the direction 38 towards the trailer vehicle 36, the alignment device 18 comes into contact with the front side 48 of the trailer vehicle 36 and aligns the outrigger 16. This is shown in FIG. 5.

Figure 5:
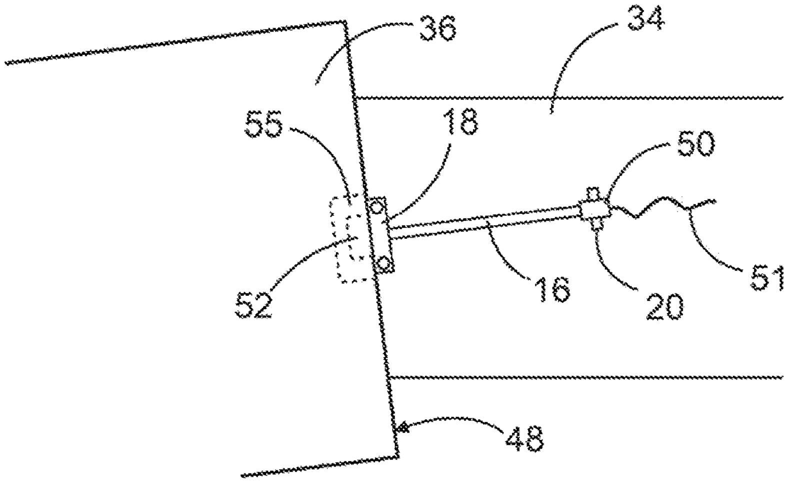
FIG. 5 shows an alignment of the outrigger during while a trailer vehicle and a towing vehicle are being coupled.

FIG. 5 shows that the alignment device 18 has aligned the outrigger 16, which is now perpendicular to the trailer front side 48. Now the gripper arm 20 has to be moved to the front side 48 of the trailer vehicle 36 to establish a connection between the truck connector 50 and a trailer connector 52, which is positioned in an opening 55 of the front side 48 of the trailer vehicle.

Figure 6:
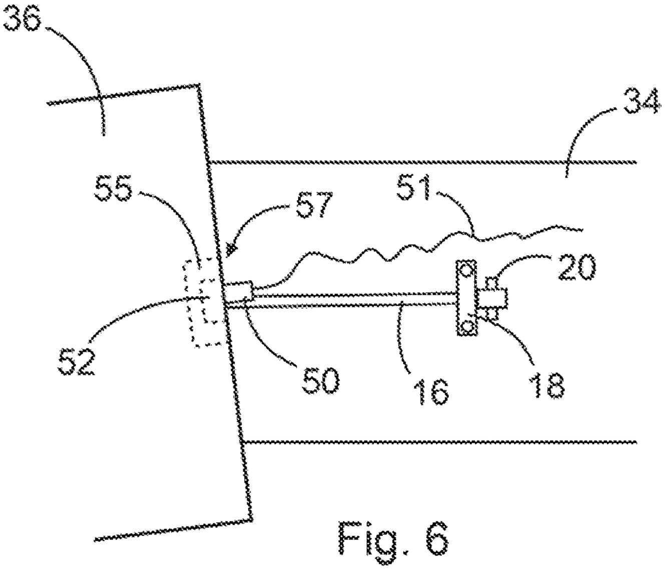
FIG. 6 shows a device after establishing the connection in the rest position.

FIG. 6 shows that the gripper arm 20 and the alignment device 18 are moved away from the trailer vehicle 36 after the gripper arm 20 has established the connection 57. Thus, the truck connector 50 is left connected with the trailer connector 52.

Figure 7:
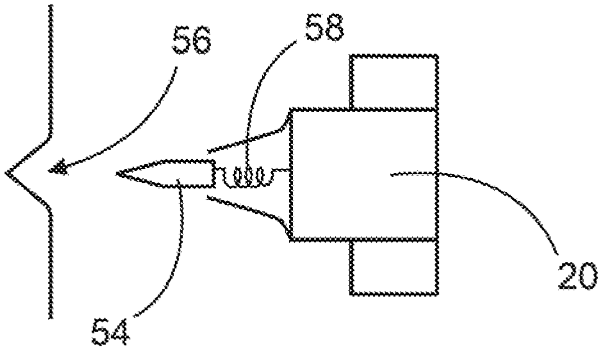
FIG. 7 shows an alignment pin and a trailer recess.

FIG. 7 discloses a part of the gripper arm 20, which includes an alignment pin 54. The alignment pin 54 is arranged for aligning the gripper arm 20 in a recess 56. The alignment pin 54 is mounted to the gripper arm 20 by a spring 58 to move the alignment pin 54 backwards to enable establishing the connection between the truck connector 50 and the trailer connector 52.

Figure 8:
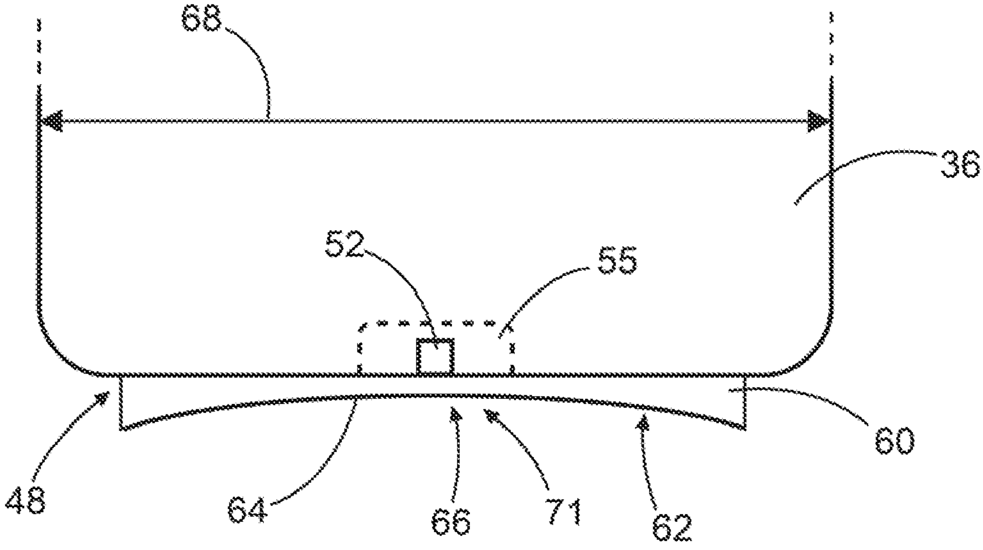

FIG. 8 discloses a front side 48 of a trailer vehicle 36 with a mounting part 60, wherein the mounting part 60 includes a front part 62, which has a concave surface 64. In the middle 66 of the width 68 of the trailer vehicle, the concave surface 64 includes the lowest point 71.

Figure 9:
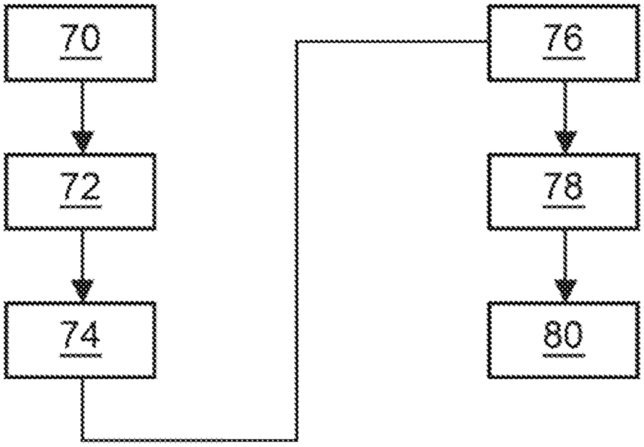
FIG. 9 shows steps of a method according to an embodiment.

FIG. 9 shows the steps of the method for establishing a connection between a truck connector 50 and a trailer connector 52 according to an embodiment. In step 70, an outrigger of the device is held in a rest position. In step 72, while the towing vehicle is being moved towards the trailer vehicle, the alignment device aligns the outrigger to the trailer vehicle. In step 74, a gripper arm moves the truck connector towards the trailer vehicle. In step 76, a connection is established between the truck connector and the trailer connector. In step 78, the gripper arm releases the connection to the truck connector and in step 80, the gripper arm and the alignment device are moved away from the front of the trailer vehicle.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

10 device
12 system
14 fifth wheel
16 outrigger
18 alignment device
19 longitudinal axis
20 gripper arm
21 connection
22 fastening point
24 vertical axis
26 upper part
28 lower part
30 connection
31 adapter unit
32 bottom
34 towing vehicle
36 trailer vehicle
38 direction
40 kingpin
42 rest position
43 trailer longitudinal axis
44 end
45 angle
46 alignment position
47 longitudinal axis of towing vehicle
48 trailer front side
50 truck connector
51 connection lines
52 trailer connector
54 alignment pin
55 opening
56 recess
57 connection
58 spring
60 mounting part
62 front part
64 concave surface
66 middle
68 width
70 outrigger is held in a rest position
71 lowest point
72 alignment device aligns the outrigger to the trailer vehicle
74 gripper arm moves the truck connector towards the trailer vehicle
76 connection is established between the truck connector and the trailer connector
78 gripper arm releases the connection to the truck connector
80 gripper arm and the alignment device are moved away from the front of the trailer vehicle

The invention claimed is:

1. A device for automatically establishing at least one connection between a towing vehicle and a trailer vehicle, the device comprising:

an outrigger extending along a longitudinal axis, said outrigger being configured to be connected to a fastening point of the towing vehicle and to pivot around the fastening point;

an alignment device slidably mounted to said outrigger and configured to align said outrigger to the trailer vehicle, said alignment device including a cross member slidably mounted at said outrigger, wherein said cross member defines a cross member longitudinal axis which is perpendicular to the longitudinal axis of the outrigger;

a gripper arm slidably mounted to said outrigger and configured to hold a truck connector;

a gripper arm drive for moving said gripper arm in both directions of the longitudinal axis of said outrigger; and, said alignment device being configured to slide along said outrigger independently of said gripper arm.

2. The device of claim 1, wherein said gripper arm includes a mechanism and an actuator for establishing and releasing a detachable connection between said gripper arm and the truck connector.

3. The device of claim 1 further comprising:

an alignment drive for moving said alignment device in both directions of the longitudinal axis of said outrigger.

4. The device of claim 1, wherein said gripper arm includes an alignment pin arranged for aligning said gripper arm to a trailer recess.

5. A towing vehicle comprising the device of claim 1.

6. A truck-trailer combination comprising:

the towing vehicle according to claim 5; and, a trailer vehicle having a trailer connector and configured to be connected to said towing vehicle via said trailer connector.

7. A trailer vehicle configured to be connected to a towing vehicle comprising the device of claim 1, the trailer vehicle comprising a trailer connector.

8. The trailer vehicle of claim 7 further comprising at least one of a mounting part and a trailer recess configured to receive an alignment pin.

9. A method for automatically establishing connections between a towing vehicle and a trailer vehicle, the method comprising:

establishing or releasing a connection between the towing vehicle and the trailer vehicle via the device of claim 1.

10. The method of claim 9 further comprising the steps:

aligning the outrigger of the device via the alignment device moving the gripper arm with the truck connector via the gripper arm drive along said outrigger for establishing a connection with a trailer connector;

releasing a connection between the truck connector and the gripper arm; and, moving the gripper arm and the alignment device along the outrigger away from the trailer vehicle.

11. The method of claim 9 further comprising:

aligning the outrigger via the alignment device;

moving the gripper arm towards the trailer vehicle;

establishing a connection between the gripper arm and the truck connector; and, pulling the truck connector with the gripper arm by moving the gripper arm away from the trailer vehicle.

12. A device for automatically establishing at least one connection between a towing vehicle and a trailer vehicle, the device comprising:

an outrigger extending along a longitudinal axis, said outrigger being configured to be connected to a fastening point of the towing vehicle and to pivot around the fastening point;

an alignment device slidably mounted to said outrigger and configured to align said outrigger to the trailer vehicle;

a gripper arm slidably mounted to said outrigger and configured to hold a truck connector;

a gripper arm drive for moving said gripper arm in both directions of the longitudinal axis of said outrigger;

an alignment drive; and, a spring configured to move said alignment device in a first direction of the longitudinal axis and a connector for detachably connecting said alignment drive to said gripper arm for moving said alignment device in a second direction opposite to the first direction of the longitudinal axis.

13. A system comprising:

a device for automatically establishing at least one connection between a towing vehicle and a trailer vehicle;

a truck connector;

said device including an outrigger, an alignment device, a gripper arm, and a gripper arm drive;

said outrigger extending along a longitudinal axis, said outrigger being configured to be connected to a fastening point of the towing vehicle and to pivot around the fastening point;

said alignment device being slidably mounted to said outrigger and configured to align said outrigger to the trailer vehicle, said alignment device comprising a cross member slidably mounted at the outrigger, wherein the cross member includes a longitudinal axis, which is perpendicular to the longitudinal axis of the outrigger;

said gripper arm being slidably mounted to said outrigger and configured to hold said truck connector;

a gripper arm drive for moving said gripper arm in both directions of the longitudinal axis of said outrigger;

said alignment device being configured to slide along said outrigger independent of said gripper arm; and, said truck connector being configured to detachably connect to said gripper arm.

14. The system of claim 13 further comprising:

a fifth wheel having a lower part for connecting said fifth wheel with the towing vehicle and an upper part for providing a contact surface to the trailer vehicle; and, said fastening point being arranged at said upper part.

15. The system of claim 14, wherein said upper part has a bottom; and, said fastening point is arranged at said bottom of said upper part.

16. The system of claim 14, wherein said fifth wheel includes a kingpin opening for receiving a kingpin and allowing the kingpin to rotate around a kingpin rotation axis; and, said fastening point is arranged below said kingpin opening so as to allow said outrigger to pivot around the kingpin rotation axis.

17. The system of claim 13 further comprising:

a mounting part configured to be mounted on a trailer front of the trailer vehicle;

said mounting part being configured to be arranged at the trailer vehicle and extend along a length at least at a predominant section of a width of the trailer vehicle;

said mounting part including a front part having a concave surface configured to face away from the trailer front; and, said concave surface having a lowest point lying centrally with respect to said length of said mounting part.

18. A towing vehicle comprising the system of claim 13.

19. A trailer vehicle configured to be connected to a towing vehicle comprising the system of claim 13, the trailer vehicle comprising a trailer connector.

20. A method for automatically establishing connections between a towing vehicle and a trailer vehicle, the method comprising:

establishing or releasing a connection between the towing vehicle and the trailer vehicle via the system of claim 13.

* * * * *